United States Patent [19]

Mihora et al.

[11] Patent Number: 5,651,516

[45] Date of Patent: Jul. 29, 1997

[54] SHOCK WAVE STABILIZATION APPARATUS AND METHOD

[75] Inventors: Dennis J. Mihora, Santa Barbara; Walter E. Cannon, San Jose, both of Calif.

[73] Assignee: Condor Systems, Inc., San Jose, Calif.

[21] Appl. No.: 638,717

[22] Filed: Apr. 29, 1996

Related U.S. Application Data

[62] Division of Ser. No. 332,918, Nov. 1, 1994.

[51] Int. Cl.[6] .................... B64C 21/00; B64C 3/54; B64C 5/06; F42B 10/02

[52] U.S. Cl. .................... 244/204; 244/3.24; 244/218; 244/91

[58] Field of Search .................... 244/3.24, 35 A, 244/198, 200, 203, 204, 213, 214, 218, 45 R, 82, 91, 78

[56] References Cited

U.S. PATENT DOCUMENTS

| | | | |
|---|---|---|---|
| 2,885,161 | 5/1959 | Kerker et al. | 244/91 |
| 3,179,052 | 4/1965 | Jasse | 244/3.24 |
| 3,272,124 | 9/1966 | Marsh et al. | 244/3.24 |
| 4,014,481 | 3/1977 | Daikeler et al. | 244/213 |
| 4,427,167 | 1/1984 | Daniels | 244/3.24 |
| 4,739,957 | 4/1988 | Vess et al. | 244/91 |
| 5,209,438 | 5/1993 | Wygnanski | 244/204 |

OTHER PUBLICATIONS

John J. Bertin et al., *Aerodynamics For Engineers*, Second Edition, 1989 Prentice Hall, Inc., pp. 138, 139, 548 and 549.

Primary Examiner—Andres Kashnikow
Assistant Examiner—Virna Lissi Mojica
Attorney, Agent, or Firm—J. Michael Johnson

[57] ABSTRACT

An apparatus and method of stabilizing unstable shock waves on the surface of a body induce shock waves to form prematurely at a particular location on a surface of the body and fix that location such that shock waves will form consistently and persistently at that location on the surface of the body. Boundary layer flow separates from the surface of the body at that location and can be prevented from reattaching to the surface. Shock wave oscillations due to interactions with the separated boundary layer flow are prevented, thereby minimizing vibrations induced in the body. The apparatus has a flow accelerating surface and a discontinuity in the accelerating surface. The accelerating surface causes local fluid flow over the surface of the body to accelerate and prematurely and consistently form a shock wave at the point where the discontinuity is located. The discontinuity causes separation of the boundary layer flow from the body surface and fixes the location where the boundary layer flow separation occurs. The method prematurely forms a shock wave at a set location on the surface of the body and fixes both the formation of shock waves to the set location and the separation point where the boundary layer detaches from the surface of the body.

3 Claims, 9 Drawing Sheets

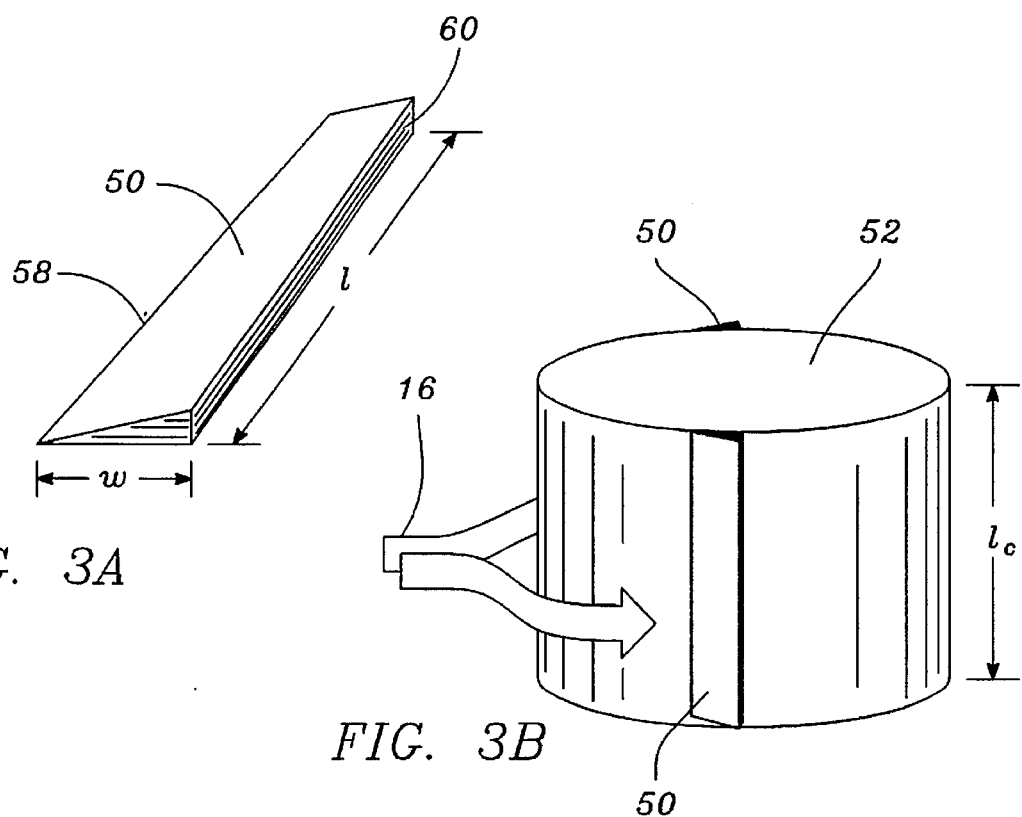
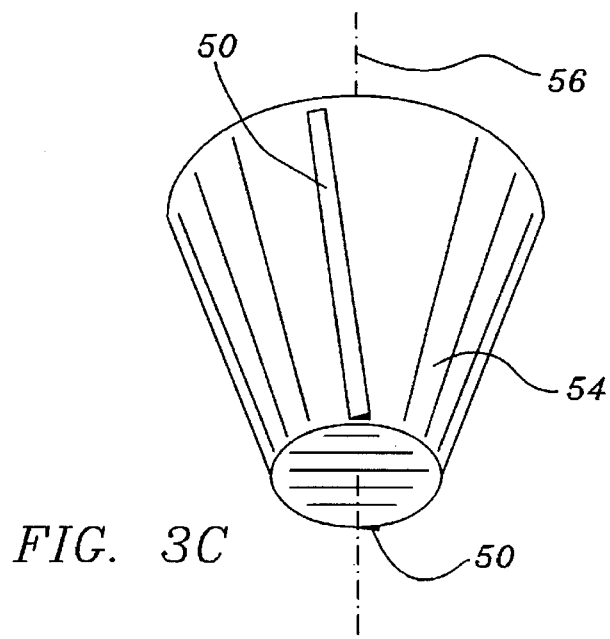
FIG. 3A
FIG. 3B
FIG. 3C

SHOCK WAVE STABILIZATION APPARATUS AND METHOD

This is a division of application Ser. No. 08/332,918 filed Nov. 1, 1994.

BACKGROUND OF THE INVENTION

1. Field of the Invention

The present invention relates to minimizing vibrations or oscillations of a body moving through a fluid at transonic speeds due to shock wave instabilities. In particular, the present invention relates an apparatus and method of predictably forming and fixing the location era shock wave on a body moving through the air such as a wing mounted pod on an airborne aircraft, thereby minimizing induced vibration.

2. Description of the Related Art

Vibrations resulting from unsteady transonic flow is a serious problem for aircraft traveling at subsonic/transonic velocities. Induced vibrations are particularly acute when associated with relatively thick bodies such as instrument pods and weapons systems suspended from wings on many military aircraft. Transonic induced vibration levels can become so severe that they can pose a threat to the safety of the aircraft and crew. The vibrations encountered at transonic flow velocities are largely attributable to unstable interaction between the shock wave and the turbulent flow region trailing behind the shock wave. The flow behind the shock wave no longer follows the contours of the body and is called a separated flow or separated boundary layer. The fluid in the separated flow region and in the wake of the body is turbulent. To better understand the source of the vibrations and their relationship to the shock wave/separated flow interactions, a brief review of the progression from subsonic through transonic flow is described.

Consider the case of a smooth body 10 of FIG. 1 with a leading edge 12 pointing directly into the flow and a trailing edge 14 traveling through a semi-viscous medium such as air with a flow direction indicated by the arrow labeled 16. FIGS. 1A through 1D illustrate four stages of local transonic flow that such a smooth body 10 will experience as the freestream flow velocity is gradually increased. In the sequence shown in FIG. 1A trough 1D the freestream velocities range from values at which sonic conditions are first achieved near the body surface to freestream velocities at the upper end of transonic flow just below the supersonic range. The freestream region 18 of the flow is the flow that exists in the absence of influence from the body. The velocity of the flow in the freestream region is called the freestream velocity. The term semi-viscous is used because even largely inviscid fluids such as air exhibit viscosity when flowing around a body due to the shear stress that exist in the boundary layer 20 of the body 10. The boundary layer 20 illustrated in FIG. 2 is a layer of fluid in direct contact with the body surface 24 and extend some distance above the surface. In this layer 20, the velocity of the fluid flow increases rapidly as a function of distance from the body 10 as indicated by the length of the arrows collectively designated 22. The flow at the body surface 24 is zero. Above the upper limit of the boundary layer 26, the flow velocity is no longer a strong function of the distance from the body 10. Above the upper limit 26 the flow velocity as indicated by the arrow 28 corresponds to the local flow velocity in the vicinity of the body 10.

Fluid flow around smooth bodies at subsonic and low transonic freestream flow velocities in both inviscid and viscous fluids is ideally laminar as illustrated in cross-section in FIG. 1A. The freestream region 18 of the flow encounters the leading edge 12 of the body 10 and transitions to a flow around the body 10 that is largely laminar. Ideally, the flow around the body is smooth and not separated following along the body 10 contour. In reality, a vortex wake 19 with some flow separation and minor turbulence is almost always present at the trailing edge 14 of the body 10 even at very low flow velocities. The presence of the wake 19 does not generally change the nature of the smooth, non-separated flow over much of the rest of the body 10. While smooth, the flow velocity around the body is not constant due to the requirement of conservation of mass. Velocities of the flow near the body 10 increase from the freestream value at the forward or leading edge 12 to a maximum velocity near the thickest point, hereinafter called the high point 30 of the body 10. In the ideal situation, flow velocity then decreases until the trailing edge 14 is encountered and the freestream velocity is reestablished. Under real, non-ideal flow conditions the smooth decrease in flow velocity is interrupted by the vortex wake 19 somewhere before the flow reaches the trailing edge 14.

As the freestream velocity increases from purely subsonic to transonic velocities, a critical velocity $M_{crit}$ is eventually reached where the local flow near high point 30 reaches the speed of sound, or 1 Mach, and becomes sonic. This condition is illustrated in FIG. 1A and is characterized by the formation of a sonic point 32 at the high point 30. The sonic point 32 is a small region or point of flow that has reached the speed of sound. The flow elsewhere on the body is not appreciably altered by sonic point 32 formation. Generally, bodies have a pair of the high points 30 on opposite sides of the body 10. A cylinder or other linearly extended bodies, has a pair of high points that are actually high regions with finite lengths orientated perpendicularly with respect to the flow direction. A sphere has a high point ring encircling the sphere.

A further increase in the freestream velocity extends the region of local supersonic flow downstream as illustrated in FIG. 1B and results in the formation of shock waves 34 and 35 at a trailing edge of the sonic point 32 which has expanded to become a sonic flow region 36. The shock waves 34 and 35 begin to form when the local flow velocity exceeds about 1.2 Mach. The leading edge boundary of the supersonic flow region 36 is called the sonic line 37 for both of the shock waves 34 and 35 in FIG. 1B. Due to the viscous nature of the fluid flow near the body 10, the shock wave/boundary layer interaction initially thickens the boundary layer 20 and then results in the separation of the flow from the surface 24. Initial onset of separation begins with a characteristic separation bubble 38 forming just behind the shock waves 34 and 35. The wake vortex region 19 is typically widened by the separation bubble 38 formation. In some cases at velocities near that required for initial shock wave 34, 35 formation, the flow may reattach downstream from the separation bubble 38.

FIGS. 1C and 1D illustrate what happens when the freestream velocity has increased enough to result in massive boundary layer flow separation 40 behind the shock wave. At this stage, there is little chance for flow re-attachment to the body 10. The separated flow region 40 downstream of the shock waves 34 and 35 is characterized by severe turbulence and a large, non-symmetrical, time-varying wake vortex region 19. The flow velocity required to induce shock wave formation and the resulting complete boundary layer separation 40 for a given body 10 is dependent on the Reynolds number and the surface curvature.

There is strong coupling between the shock waves 34 and 35 and the separated flow 40. The turbulence and instabilities in the separated flow 40 are reflected in oscillatory instabilities in the strength and positions of the shock waves 34 and 35. Oscillatory motion of the shock wave 34 and 35 produces further turbulence in the separated flow 40 and wake vortex 19. The shock waves 34 and 35 on opposite sides of the body are also coupled through the separated flow and wake vortex. As the shock wave oscillations and flow turbulence levels increase, the two shock waves 34 and 35 begin to oscillate forward and backward in a coupled manner. When the bottom shock wave 35 increases in strength it moves backwards which increases the shock wave induced separated flow thickness 40 and pulls the wake vortex 19 down and off-center as illustrated in FIG. 1C. This causes the upper slightly weaker shock wave 34 to move backwards and the lower shock wave 35 to move forward until a condition such as that illustrated in FIG. 1D exists. The shock waves 34 and 35 will tend to oscillate back and forth between the two conditions illustrated in FIGS. 1C and 1D as indicated by the two-headed arrow 44.

The periodic and non-symmetric instability of the shock wave/boundary layer interaction results in large pressure fluctuations on the body surface 24. The pressure fluctuations produce a time-varying differential lift force and, in turn, impart a strong time-varying vibration or buffeting of the body 10. This vibration, directly related to the shock wave instabilities, can be very severe. Under some combinations of speed and body shape, the vibrations can result in structural failure leading to the potential loss of the aircraft and crew. In addition, the critical velocity $M_{crit}$ is highly dependent on the body shape, curvature, and angle of attack so practical aircraft may have several different critical velocities where vibration is a concern.

Much attention has been paid to buffeting in the transonic velocity range due to the potentially disastrous consequences to aircraft, crew and passengers. The approach to minimizing the buffeting has usually been concentrated on careful aerodynamic shaping of aircraft structures to minimize the existence of shock wave induced separation 40 and/or the avoidance of operating in the transonic region through the implementation of flight speed restrictions. However, it is usually impossible to produce airframe components that are always shape-optimized. Local supersonic conditions can occur at a number of subsonic aircraft speeds on most practical aircraft. This problem is exacerbated when pods or other devices are attached to the airframe as is often done for military purposes. Pods are often relatively thick structures falling into the class of bodies known in the art as bluff bodies and have freestream $M_{crit}$ values in the range of 0.4 to 0.7 Mach, much lower velocities than that of the aircraft alone. Vibrations in the pod structures can be so severe at particular velocities that the vibrations can result in the destruction of the pod to wing mounting structure and potentially the loss of the entire aircraft.

Methods for controlling unstable transonic flow and the induced vibrations have been implemented with varying success as an alternative to flight speed restrictions. Altering of airfoil and fuselage shapes has proven relatively successful for many airframe related problems. However, the shape of the pod is often dictated by other than aerodynamic considerations. In cases where non-aerodynamic considerations dictate shapes or in cases when shape optimization may be otherwise impractical, other techniques are needed.

One technique, known as Laminar Flow Control (LFC) discussed by Bertin and Smith, *Aerodynamics for Engineers, Second Edition*, Prentice Hall, 1989, pages 548–549, seeks to control turbulence and thereby control induced vibrations by maintaining the laminar flow condition. In LFC, laminar flow is maintained by the removal of the inner most part of the boundary layer using suction. LFC is normally used for drag reduction rather than transonic flow instability problems but can help delay the onset of severe turbulence.

Another method of preventing or delaying the onset of vibrations associated with the unstable shock waves is the use of vortex generators. This method seeks to prevent boundary layer separation by purposely inducing a shallow turbulent boundary layer (Bertin and Smith, 1989, pages 138–139) over the body surface. Vortex generators are rows of vertical fences arranged in an inclined manner relative to the flow that disrupt the laminar flow and produce a weakly turbulent boundary layer. The vortex generators have the effect of delaying the separation of flow associated with shock wave formation. Both of these methods attempt to prevent or delay the formation of the shock wave instead of addressing the instabilities in the shock wave that are the ultimate cause of the vibration problem.

It would be desirable to have an apparatus and/or method to stabilize the unstable shock waves 34 and 35 thereby preventing or minimizing induced vibrations to the body 10. A device or method that can be retrofitted or applied to aircraft structures such as those that typically experience vibrations during flight, would solve a long standing unsolved problem associated with transonic flight and known in the aerodynamic art.

SUMMARY OF THE INVENTION

An apparatus and method of stabilizing normally unstable shock waves are disclosed. The apparatus and method according to the invention prematurely form or induce shock waves at a particular location on a surface of a body and fix that location such that shock waves will form consistently and persistently at that location on the surface of the body. Boundary layer turbulence separates from the surface of the body at that location and is prevented from reattaching to the surface. Shock wave oscillations, due to interactions with the separated boundary layer flow described above in the related art are prevented by the present invention, thereby minimizing vibrations induced in the body.

In accordance with the principles of the present invention, the apparatus according to the invention is shaped and located on the surface of the body to confront fluid flowing over the body's surface. The apparatus comprises means for accelerating fluid flow in a boundary layer near a surface of a body to a supersonic velocity, and a discontinuity in the means for accelerating for preventing the shock wave from moving, for causing detachment of the boundary layer of flow and for fixing the location of the boundary layer separation point. In a preferred embodiment, the apparatus is a projection formed on the surface of the body. The projection can be wedge shaped with a ramped or accelerating surface having different characteristic shapes, depending on the embodiment. The means for accelerating provides a gradually increase in the height or width of the body at the set location to induce acceleration of fluid flow at that location to a maximum or supersonic velocity. The gradual increase in height changes the natural high point on the body, such that the shock wave is always formed at the set location. Moreover, the apparatus comprises a discontinuity to the means of accelerating that causes detachment of the boundary layer flow and prevents reattachment of the boundary layer to the surface of the body once the shock wave is formed.

A method of stabilizing the location where a shock wave forms on a body moving through fluid is provided which comprises prematurely forming a shock wave at a location forward of a natural high point on the body and consistently fixing the shock wave formation at the forward location. In a preferred embodiment, the method comprises the steps of determining the region where shock waves typically or naturally form, setting a location forward of the region to a single fixed point. The method further comprises gradually accelerating fluid flow over the surface of the body to a maximum velocity at the set location to thus prematurely and consistently form a shock wave in this set location. Moreover, the method of the preferred embodiment further comprises causing detachment of a boundary layer of flow and preventing the reattachment of the boundary layer fluid flow to the surface of the body after the shock wave has formed. Turbulent fluid flow is present at the surface of the body aft of the set location where the shock wave is induced by the present invention. By fixing the boundary layer separation point on the surface of the body, the turbulent flow can not affect the induced the shock wave to vibrate or oscillate and become unstable.

The method and apparatus of the present invention minimizes vibrations of the body which normally result from shock waves that form in different locations in a periodic fashion over the body's surface and at different mach speeds. The method and apparatus stabilize the location of the formation of the shock wave to a single location such that the body no longer vibrates or oscillates due to periodically forming shock waves over the surface of the body.

These and other features and advantages of the present invention will be apparent from the following more detailed description of the preferred embodiment, taken in conjunction with the accompanying drawings, which illustrate by way of example, the principles of the present invention.

BRIEF DESCRIPTION OF THE DRAWINGS

Further details are explained below with the help of the examples illustrated in the attached drawings in which:

FIG. 3A is a perspective illustrations of the shock stabilizer of the present invention and FIGS. 3B and 3C illustrate its installed configuration on two typical bluff bodies.

DESCRIPTION OF THE PREFERRED EMBODIMENTS

Figure 1A:
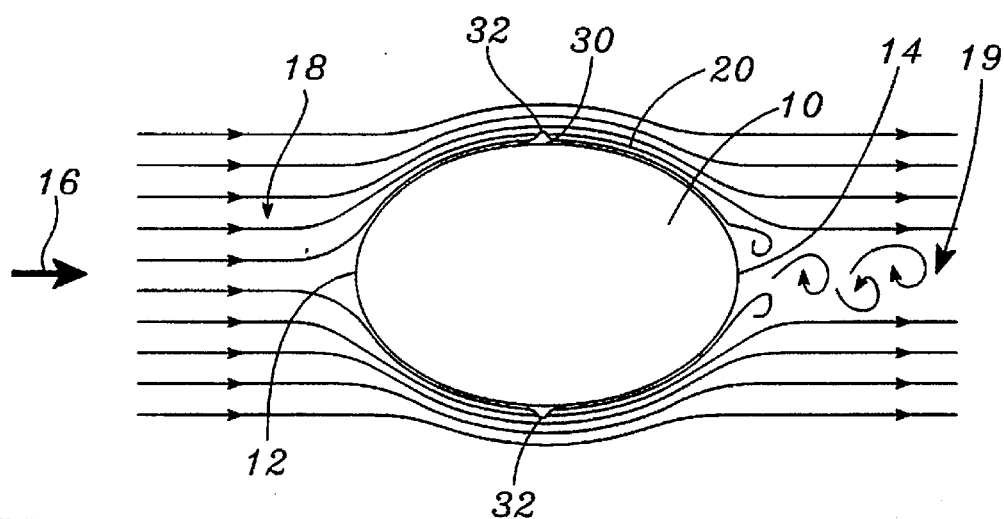
FIGS. 1A–1D illustrate in cross-section the progression from subsonic to transonic flow about a body in a viscous medium. Shown are characteristics of the flow at several different stages of flow velocities.
Figure 1B:
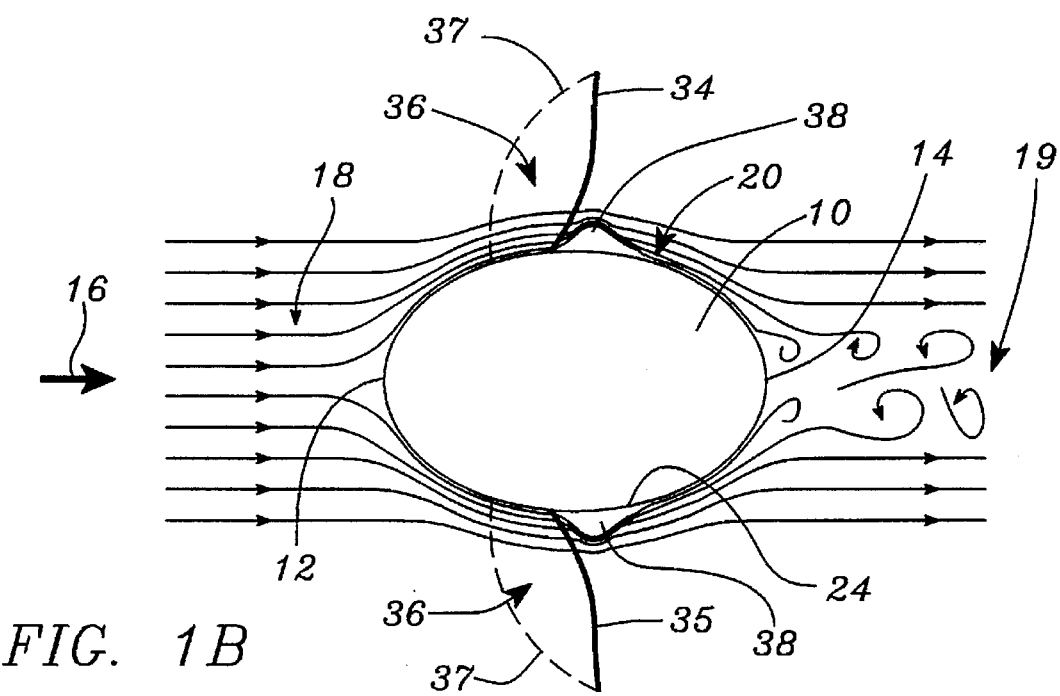

FIG. 3A is a perspective view of the shock stabilizer apparatus 50 of the present invention having a length l, and a width w. The length l and width w of the shock stabilizer 50 are determined by the size and shape of the body on which the shock stabilizer 50 is used. The length l is usually much greater than the width w. The length l of the shock stabilizer 50 should be approximately as long as the high point region on the body to which it is applied. On a cylindrical-shaped body, the high point forms a line running from one end of the cylinder to the other. A cylindrical-shaped body 52 having shock stabilizers 50 according to the invention is illustrated in FIG. 3B. In FIG. 3B, the shock stabilizer 50 has length l approximately equal to or less than the end to end length $l_c$ of the cylinder 52. On a spheroidal-shaped body (not shown), the high point can be a single point so the length l of the appropriate stabilizer 50 is nearly the same as the width w. FIG. 3C illustrates a body shaped as a truncated elliptical cone 54 the high point of which is not necessarily perpendicular to the axis 56 of the cone 54. Also illustrated in FIG. 3C is the shock stabilizer 50 of the present invention located on the high point regions of the cone 54. The shock stabilizer 50 of the present invention may be used on any shaped body to achieve the advantages of the invention. For the purposes of discussion only, the body on which the shock stabilizer 50 of the present invention is attached will be referred to generally as body 10 unless otherwise specified herein.

Figure 4A:
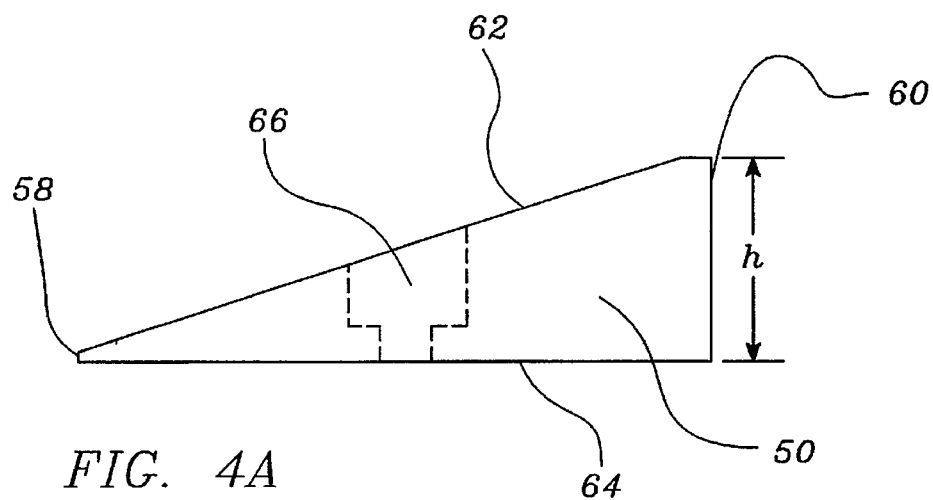
FIG. 4A–4B illustrates in cross-section and plan view a linear ramp shock stabilizer that is the preferred embodiment of the apparatus of the present invention.
Figure 4B:
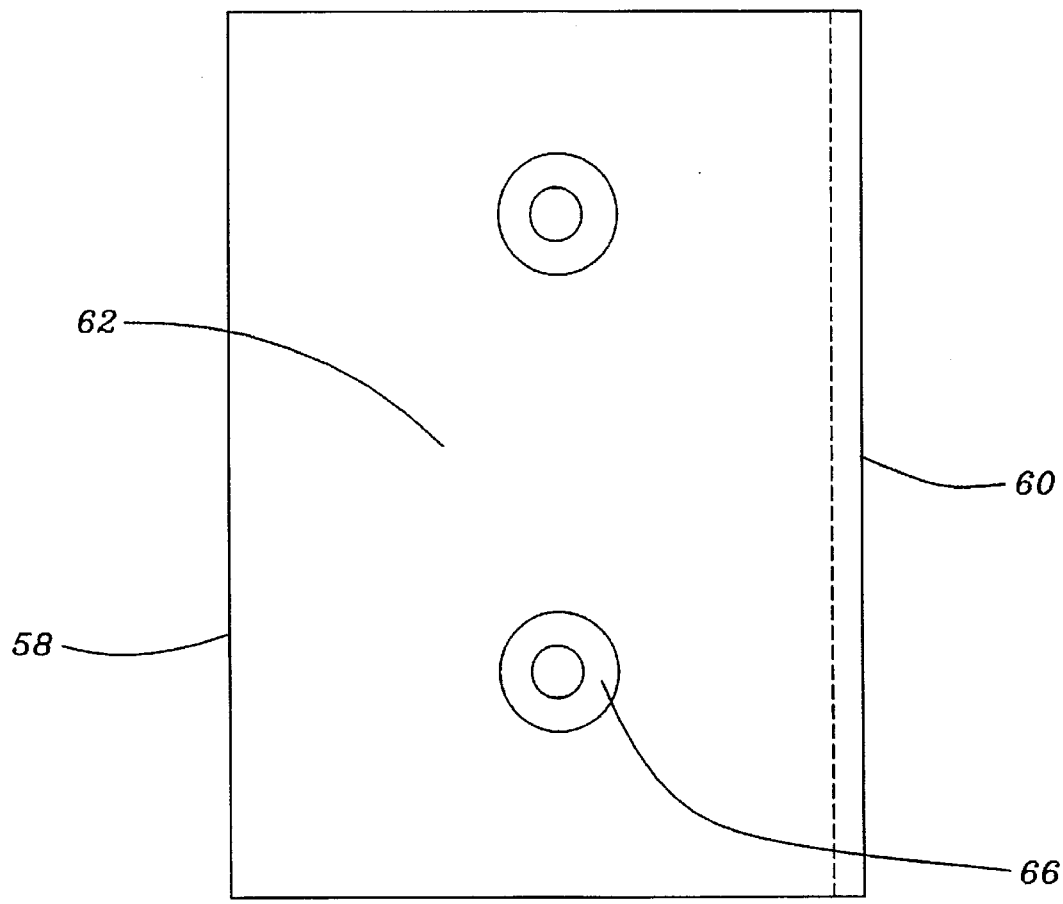

A cross sectional view of the shock stabilizer apparatus 50 according to the preferred embodiment is illustrated in FIG. 4A. The shock stabilizer 50 has a leading front or first edge 58 and an opposite trailing or second edge 60. The leading edge 58 is thinner than the trailing edge 60 giving the stabilizer 50 a wedge or ramp shape as illustrated in FIG. 4A. FIG. 4B is a plan view of the shock stabilizer 50 as viewed from above. The trailing edge 60 height h preferably should be greater than the laminar or turbulent boundary layer thickness associated with a body moving through a fluid which can be estimated using known equations found in general aerodynamics text books [Bertin and Smith, 1989], but height preferably should not be high enough to cause excessive drag. The preferred height ranges from between about 1.1 and 1.6 times the boundary layer thickness. Other heights are also possible in other applications and the present invention is not intended to be limited to any of the ranges set forth herein. The slope angle of the top or accelerating surface 62 of the shock stabilizer 50 should be great enough to create the desired acceleration but low enough to avoid the separation in the flow and premature shock wave formation before the trailing edge 60. A range of slope angles according to the present invention is between about 5 and 45 degrees with about 23 to 25 degrees being preferred. The height of the trailing edge 60 and the slope of the top surface 62 combine to set the width w.

The stabilizer 50 of the preferred embodiment should be firmly attached to the surface 24 of the body 10. This can be accomplished by means of mounting screws inserted though recessed holes 66 in the shock stabilizer 50. Alternately, another means of attachment, such as an adhesive, may be used.

Preferably, a pair of the shock stabilizers 50 are attached to a body. One stabilizer 50 each is attached to opposing sides of the body, as illustrated in FIGS. 3B and 3C. The attachment of the shock stabilizer 50 pair generally orients the length l perpendicular to the flow 16 since the high point of the body is generally oriented perpendicular also. In accordance with the invention, the slope of the top surface 62, the height h of the trailing edge 60 and the width w need not be constant along the entire length l.

When installed on a body 10 moving through a fluid, the ramp cross-section of the shock stabilizer 50, illustrated in FIG. 4A, and more particularly, the slope of the top or accelerating surface 62 unexpectedly and advantageously accelerated the flow passing over the surface 62. The flow is accelerated artificially with the stabilizer 50 beyond the velocity that would be present if the stabilizer was not attached to the body 10. The acute angle formed by the top of the trailing edge 60 created a surface discontinuity which unexpectedly and advantageously fixed the shock wave location. Furthermore, placement of the shock stabilizer 50, as described herein for the present invention, unexpectedly and advantageously prevented the shock wave from experiencing oscillation at transonic speeds.

Figure 5:
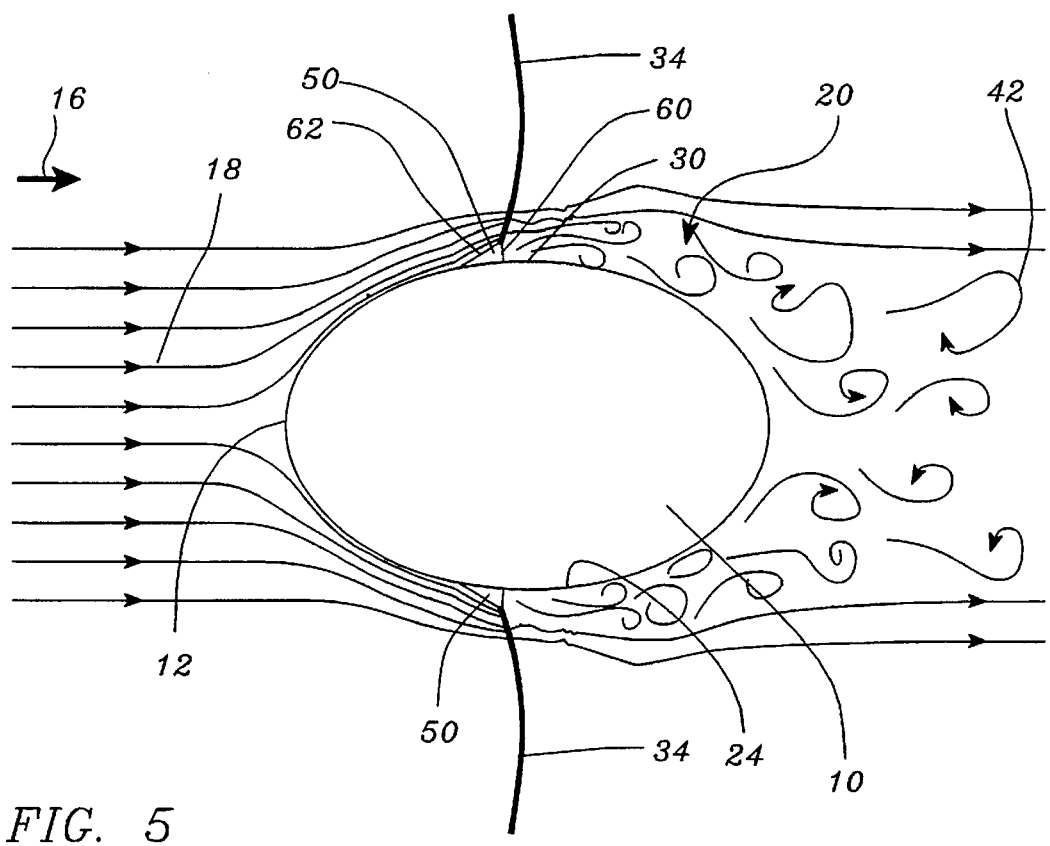
FIG. 5 illustrates in cross-section a body with a pair of shock stabilizers of the present invention attached.

FIG. 5 illustrates in cross-section a pair of shock stabilizers 50 mounted to a body 10 traveling at transonic velocity through a fluid. The shock stabilizers 50, are mounted slightly forward of the high point 30 on either side of the body 10. The shock stabilizers 50 cause the flow moving up the accelerating surface 62 to accelerate and move faster than the flow would move on the body surface 24 in the absence of the stabilizers 50 of the present invention. Since the flow over the shock stabilizers 50 is faster than over the body surface 24 both upstream and downstream of the stabilizers 50, the top of the trailing edge 60 of the stabilizer 50 becomes a new high point. Sonic velocities are first achieved and a shock wave 34 is formed near the trailing edge 60 of each stabilizer 50. In FIG. 5, the shock waves are illustrated by the bold solid lines 34 attached to the trailing edge 60 of the stabilizers 50. The incline of the ramp 62 and the discontinuity of the incline at the trailing edge 60 uniquely and consistently induce the formation of the shock wave 34 and the separation of the boundary layer 20 from the body surface 24 to occur at the trailing edge 60, thereby stabilizing the location of the shock wave 34 and preventing the shock wave 34 from moving even in the presence of strong wake turbulence 68. The shock stabilizer 50 also creates a surface discontinuity which forces the separation position of the boundary layer 20 from the body surface 24 to occur immediately aft of the trailing edge 60 and prevents the separation point from migrating along the body surface 24. The upper limit of the separated boundary layer aft of the stabilizer 50 is indicated in FIG. 6 as number 68.

The shock stabilizer 50 is located on the body 10 forward of the high point 30 to insure that the sonic point does not form in front of the shock stabilizer 50. The shock stabilizer 50 must not be located too far forward of the high point 30 or the shock waves 34 and 35 may form behind the shock stabilizer 50 instead of on the top of its trailing edge 60. Proper positioning of the shock stabilizer 50 on the body 10 eliminates the vibrations or buffeting induced in the body 10 by the differential movement of the shock wave 34 and associated separated flow region 40 on either side of the body, as described in the related art.

Figure 6:
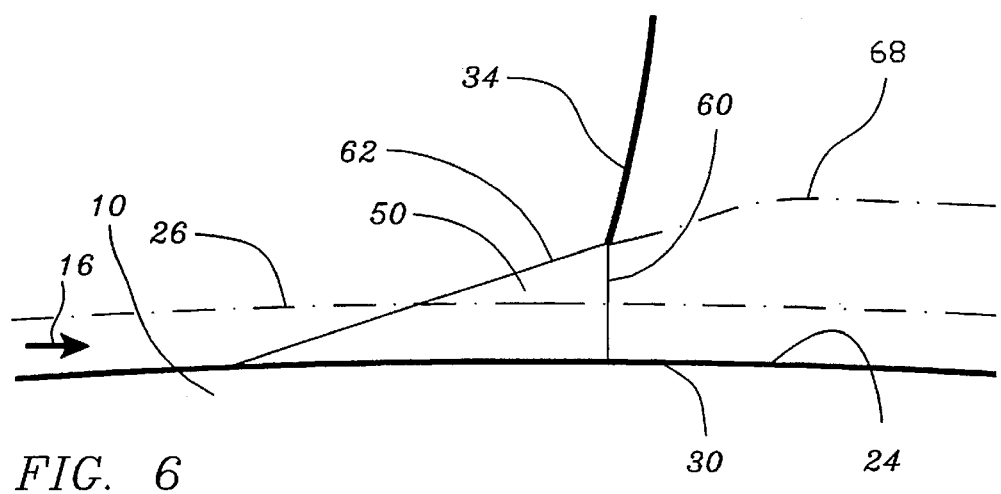
FIG. 6 is an enlarged illustration of a single shock stabilizer on a smooth body surface.

FIG. 6 shows an enlarged view of a stabilizer 50 according to the preferred embodiment mounted to a body 10. The upper limit of the natural boundary layer 26 without the stabilizer 50 is indicated by the phantom line along the surface 24 of body 10. Flow is from left to right as indicated by arrow 16. As noted above, the height of the trailing edge 60 of the shock stabilizer 50 should preferably extend above the upper limit 26 of the boundary layer 20 but should not be so high as to cause excessive drag. A range of height between about 1.1 and 1.6 times the boundary layer upper limit 26 is considered to be the best balance between drag and shock stabilization. The slope angle of the ramp accelerating surface 62 of the stabilizer 50 preferably is not be steeper than about 45 degrees to insure smooth acceleration of the supersonic flow. A very steep ramp would likely create instabilities in the shock wave 34, thereby effectively defeating the advantages of the stabilizer 50.

The mounting location and height of the shock stabilizer 50 is dependent on the size and curvature of the body 10. As mentioned above, the stabilizers 50 should normally be mounted on opposing sides of the body 10 perpendicular to the flow direction 16 and slightly forward of the widest or high point 30 of the body 10. On a cylinder 52, the high point occurs at about 90 and 270 degrees relative to the forward direction. Locations for the stabilizers 50 on a cylindrical body 52 should be in the ranges of about 65–80 degrees and about 280–295 degrees relative to the forward direction. The stabilizer 50 mounting locations on a given body normally must be determined experimentally through flight tests, wind tunnel simulations or numerical simulation using finite element modeling or a similar method. Experience has shown, however, that simple estimates do yield reasonably good stabilizer 50 locations. The height of the stabilizer 50 is also best determined experimentally. While an estimate of the boundary layer 20 thickness can be calculated using a known formula found in most aerodynamic text books, simulations or direct measurements generally yield better values. As noted above, the boundary layer 20 thickness is used a guide in determining the height h of the trailing edge 60 of the shock stabilizer 50. However, tests and simulations may be necessary to optimize the stabilizer 50 height. The ramp slope angle should be between about 5 and 45 degrees with a preferred value of around 25 degrees.

The shock wave stabilization method of the invention stabilizes the location of the formation of a shock wave on the surface of a body 10 moving in a fluid. The method determines the region of maximum flow velocity where the sonic flow condition typically will first occur on the body 10. The region 32 of natural sonic flow or sonic point is determined by identifying, preferably by measuring the highest or widest point 30 on the body 10. A location just forward of the high point 30 is identified and set. The identified location is set by attaching a projection or surface discontinuity to the surface 24 of the body 10. A projecting shock stabilizer apparatus 50 is attached to the surface 24 of the body 10 at the identified set location, according to the preferred embodiment. As described herein, the shock stabilizer apparatus 50 has a ramp-shaped accelerating surface 62 over which fluid will flow in the preferred embodiment. The ramp-shaped surface 62 has a inclined height extending from a first or leading edge 58 to a second or trailing edge 60 that accelerates the fluid flow. The method of the invention gradually accelerates fluid flow by the flow moving up the accelerating surface 62 to sonic velocity, about 1.2 Mach according to the preferred embodiment, at a fixed location or artificial high point, namely the top of the second or trailing edge 60 of the stabilizer 50, such that the shock wave is formed prematurely and consistently at the fixed location of second or trailing edge 60. Moreover, the method consistently induces the boundary layer 20 to separate from the surface 24 of the body 10 and fixes the point of persistence of the shock wave 34 at the fixed location of trailing edge 60 of stabilizer apparatus 50. According to the method of the present invention, the boundary layer 20 separation point is fixed at the body surface 24 and the shock wave 34 is prevented from moving, such that transonic shock wave induced vibrations in said body are minimized. According to the preferred embodiment, the boundary layer 20 separation point is fixed in position and the shock wave 34 is prevented from moving with an abrupt discontinuity or acute slope angle change to the inclined accelerating surface 62 at the second or trailing edge 60 of the shock stabilizer 50.

Figure 1C:
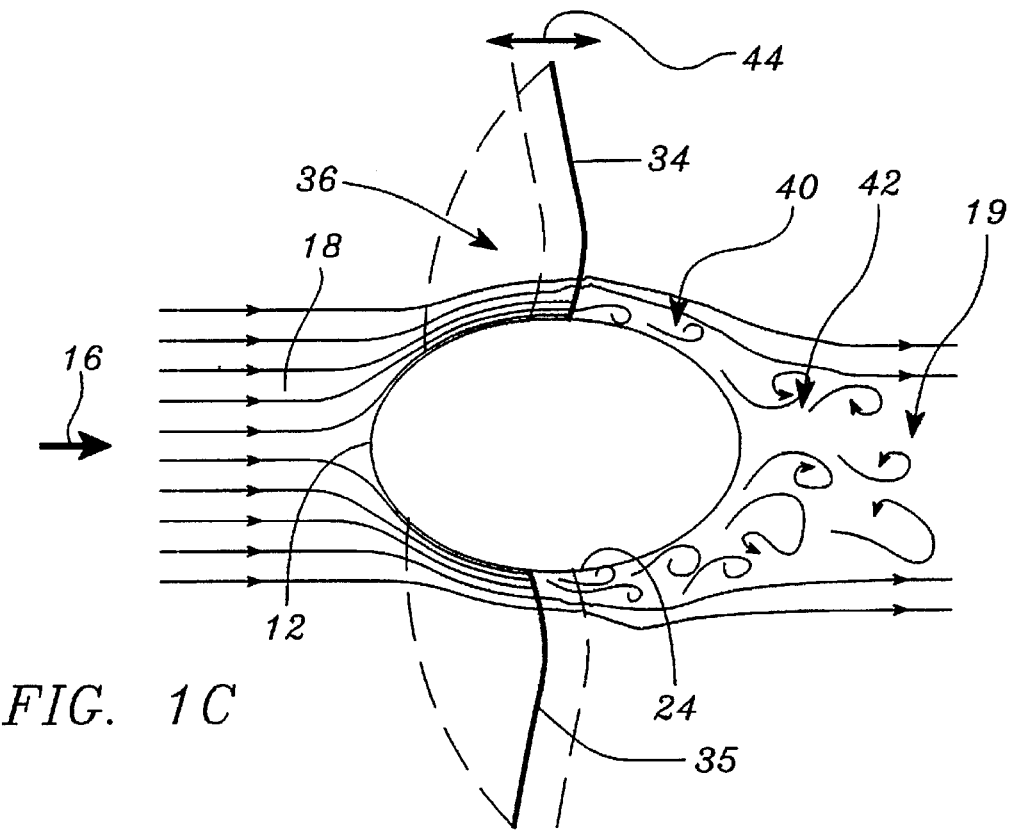
Figure 1D:
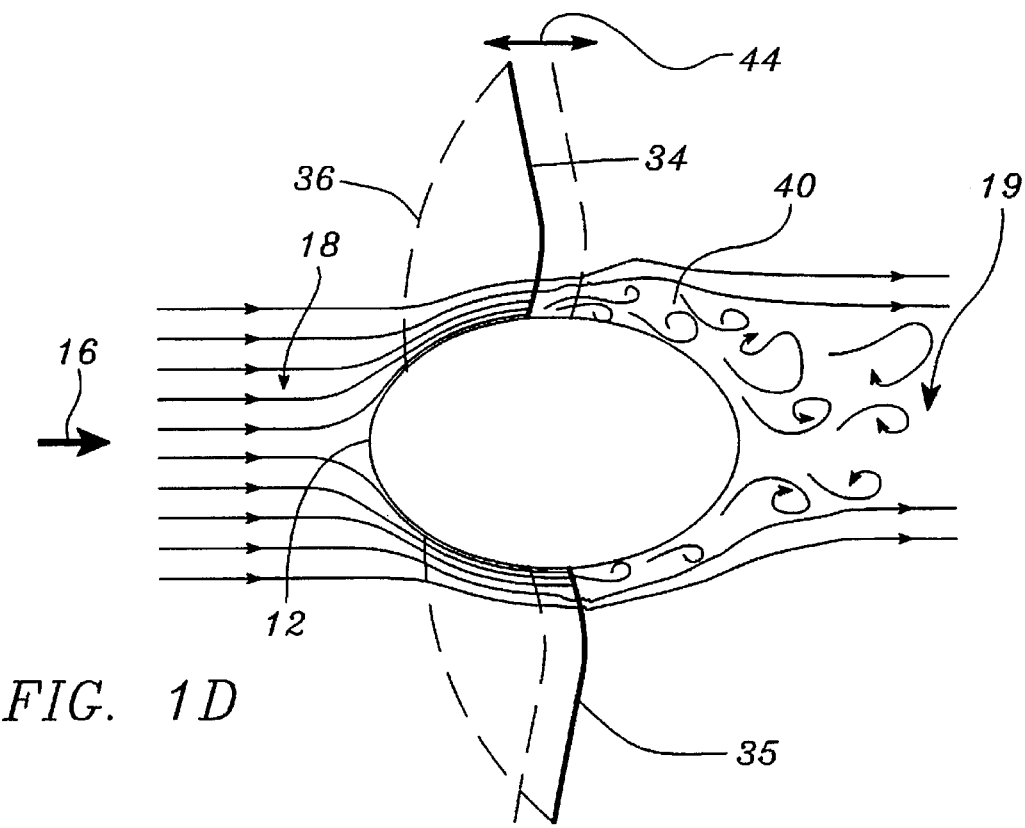
Figure 2:
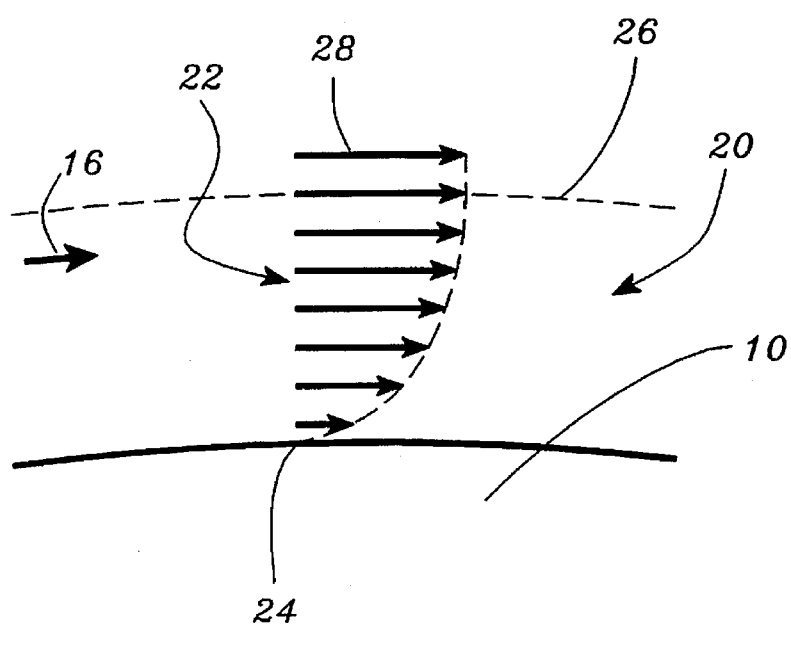
FIG. 2 illustrates the variation in flow velocity variation of the boundary layer of a smooth body surface.

According to the invention, a discontinuity to the surface 24 of the body 10 using the projecting shock stabilizer 50 provides both an prematurely induced flow acceleration to sonic velocity and provides a location where a shock wave consistently forms and persists once formed. The body surface 24 discontinuity provided by the method and apparatus of the invention ensures that the formation of the shock wave 34 and that the separation of the boundary layer 20 from the body surface 24 consistently occur a the same point, thereby preventing the movement of the shock wave as illustrated in FIGS. 1C and 1D of the related art, under the influence of strong vortex wake 19 turbulence. While preventing the reattachment of the separated flow downstream of the trailing edge 60 of the shock stabilizer 34 is feature of the preferred embodiment, applications exist where reattachment is advantageous. The scope of the present invention includes the invention operating by stabilizing the shock wave 34 and fixing the point of boundary layer detachment without preventing the reattachment of the separated flow.

Figure 7A:
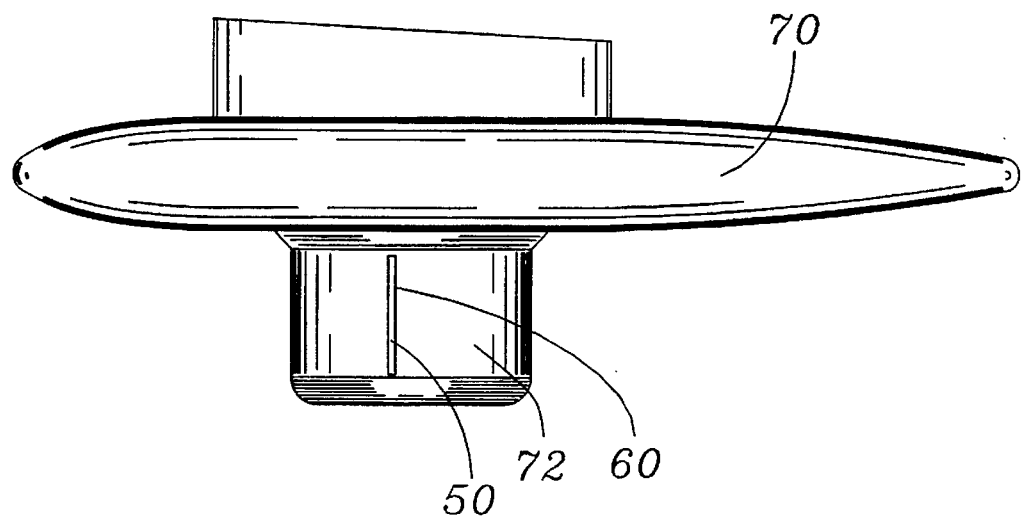
FIG. 7A–7B illustrate the shock stabilizer of the present invention attached to two different radome configurations on an AN/ALQ-78 pod.
Figure 7B:
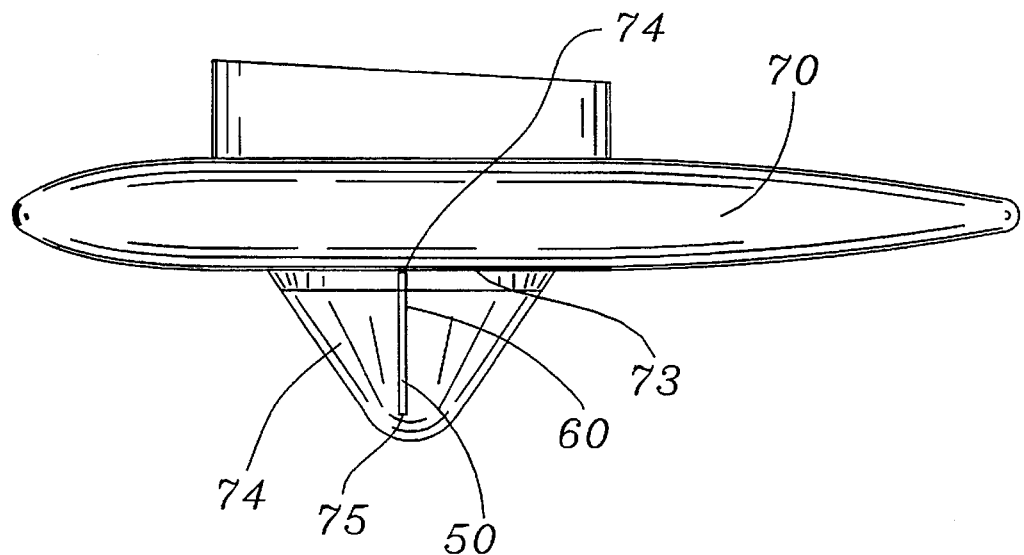

The preferred embodiment of the shock stabilizer 50 was manufactured and tested on a cylindrical radome and on an elliptical radome both of which where used on an AN/ALQ-78 pod mounted to a P-3 turboprop aircraft. The AN/ALQ-78 pod 70 with attached cylindrical radome 71 is illustrated in FIG. 7A. FIG. 7B illustrates the elliptical radome 72 attached to the AN/ALQ-78 pod 70.

The cylindrical radome was approximately 13.0 inches in radius and about 18.0 inches in height. The shock stabilizers 50 used on the cylindrical radome were 8.5 inches in length. The stabilizer accelerating surface 62 had a slope angle of 23.0 degrees with respect to the cylindrical radome surface and the trailing edge 60 was 0.4 inches high. The boundary layer thickness for the cylindrical radome 71 was estimated at about 0.36 inches. The pair of shock stabilizers 50 were attached using 4 recessed screws in each stabilizer 50. One stabilizer 50 was attached at about the 70 degree point and the other at about the 270 degree point on the cylindrical radome where the 0 degree point is taken to be in the forward direction or directly toward the flow. Initial flight test results indicated that vibrations normally observed around 0.57 MACH without the stabilizers are unexpectedly and advantageously absent with the stabilizers 50 of the present invention in place.

The shock stabilizers 50 tested with the elliptical radome 72 were approximately 17.0 inches long. The pair of stabilizers 50 were conformably mounted to the sides of the radome using 4 mounting screws per stabilizer 50. The radome 72 has a side that begins with a vertical slope that deflects inward toward the center of the pod at about a 23.43 degree slope about 3.0 inches from the top edge 73 of the radome requiring the stabilizers 50 to have similar profiles. The stabilizer 50 used on the elliptical radome had a trailing edge 60 height of 0.33 inches at the top end 74 tapering to a height of 0.12 inches at the bottom end 75. The width was similarly tapered maintaining a top surface 62 slope of 22.56 degrees.

Figure 8A:
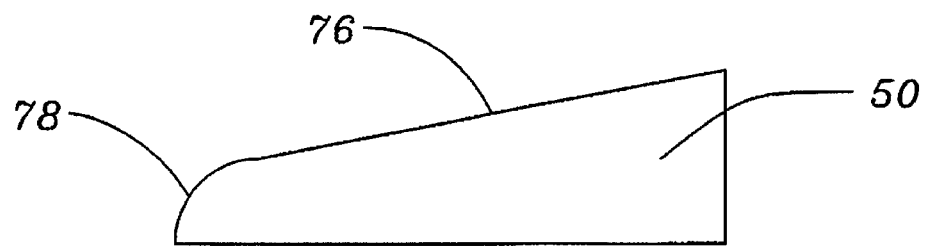
FIG. 8A–8D depicts in cross-section a number of additional embodiments of the shock stabilizer of the present invention.
Figure 8B:
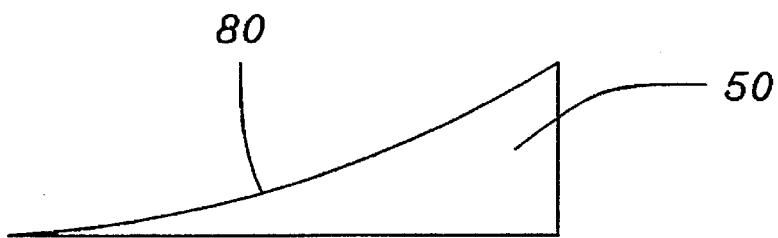
Figure 8C:
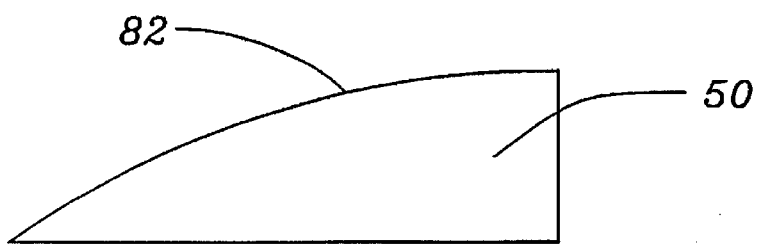
Figure 8D:
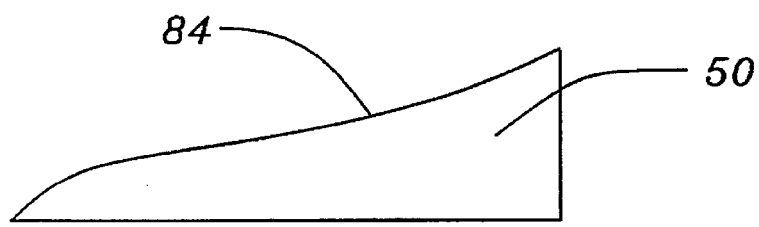

While the preferred embodiment of the shock stabilizer 50 of FIGS. 4A and 4B employs a linear ramp to achieve flow acceleration, other embodiments having different ramp shapes achieve similar results. FIGS. 8A through 8D show several other embodiments of the wedge shaped shock stabilizers 50 having different ramp shapes. FIG. 8A illustrates an end view of a shock stabilizer 50 having a linear ramp 76 and radiused leading edge 78. The leading edge 78 of the shock stabilizer in FIG. 8A has a radius to reduce flow disturbance caused by the leading edge. In this embodiment, the radiused leading edge 78 can be used to create most of the required local acceleration allowing the ramp slope to be almost zero degrees. The embodiments on FIGS. 8B–8D have non-linear accelerating surfaces. The embodiment in FIG. 8B has a concave ramp or accelerating surface 80 while the ramp shape of the embodiment of the shock stabilizer 50 illustrated in FIG. 8C has a convex ramp 82 or accelerating surface. In FIG. 8D an embodiment of the shock stabilizer 50 with a complex shaped ramp 84, including both convex and concave regions, is illustrated. Each of these embodiments will produce the desired shock stabilization results when positioned on a body 10 as described above for the preferred embodiment.

Figure 9:
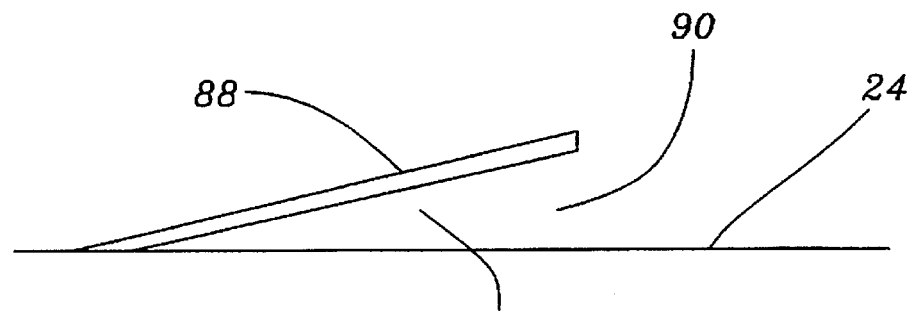
FIG. 9 illustrates an inclined fence shock stabilizer embodiment of the present invention.

An alternative embodiment to the wedge shaped shock stabilizers 50 of the preferred embodiment and those of FIGS. 8A through 8D is illustrated in FIG. 9. The shock stabilizer 86 of FIG. 9 is realized by an inclined fence 88 to accomplish flow acceleration and an open trailing edge 90 to provide the required discontinuity. The fence 88 could have any of shapes of the accelerating surface shapes illustrated in FIGS. 8A through 8D as well as a linear accelerating shape provided by the preferred embodiment in FIGS. 4A–4B. As is true for the other embodiments disclosed above, the angle that the fence makes with the body surface 24 should be no greater than about 45 degrees and the height of the trailing edge 90 should extend above the boundary layer.

Figure 10:
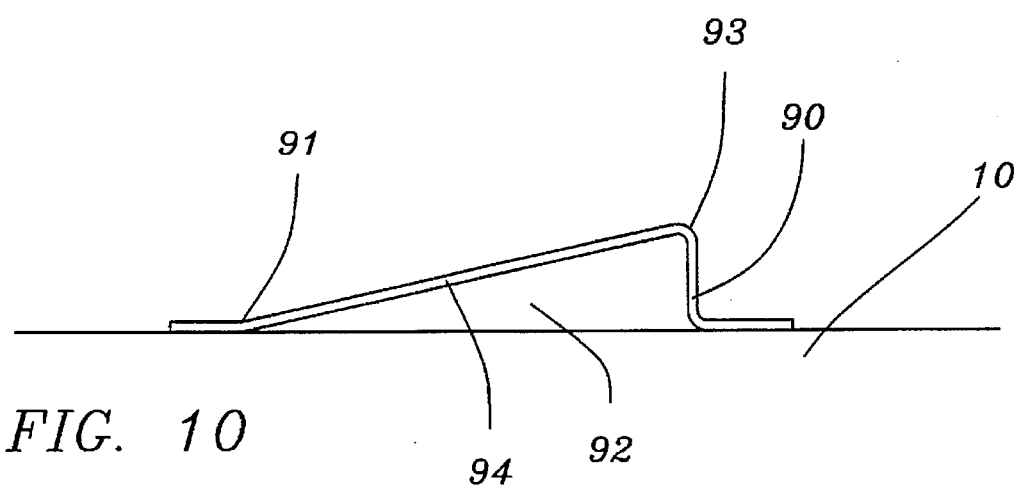
FIG. 10 illustrates an folded material embodiment of the shock stabilizer of the present invention.

The embodiment of FIG. 4A–4B is preferred because it is the easiest to manufacture and attach to the body. A linear sloped ramp 62 such as that used in the preferred embodiment of the shock stabilizer 50 is readily produced by machining the surface of an appropriate machinable material. The choice of material is dictated by the body to which the stabilizer is to be applied and appears to have little affect on the stabilization performance produced by the stabilizer 50. Normally the material should be relatively stiff to avoid deformation when subjected to the flow and shock wave pressures. In the case of the AN/ALQ-78 pod applications mentioned above, the material was a common aluminum alloy (6061-T6). A plastic material such as polycarbonate, fiberglass, or a machinable ceramic could have been substituted as well. As noted above, attachment of the stabilizers 50 can be accomplished by a variety of means including recessed mounting screws or adhesive. The AN/ALQ-78 test stabilizers 50 employed counter-sunk mounting screws. Shock stabilizers 50 may be manufactured by an extrusion process as an alternative to machining. Using extrusion methods allows the desired ramp shape to be formed directly using an appropriately shape extrusion die, thereby avoiding the need for expensive post extrusion machining. Extrusion is particularly applicable to the manufacture of shock stabilizers 50 with non-linear ramps such as those illustrated in FIGS. 8B through 8D. A shock stabilizer manufactured by folding a sheet of material such as aluminum into a hollow wedge shape is also a good means for realizing a shock stabilizer, as illustrated in FIG. 10. The stabilizer 92 is a hollow shell made by folding a sheet of material such that the stabilizer has a bend 91 at the front leading edge and a bend 93 to form a trailing edge 90. The folded sheet stabilizer 92 could have any of the accelerating surfaces illustrated in FIGS. 8A through 8D as well as that illustrated in FIG. 10.

Shock stabilizers according to the invention can be advantageously retro fitted to bodies where it has been determined that shock stabilization is necessary. In addition to realizing the present invention as a separate manufactured shock stabilizer 50 which is retro fitted to the body, the invention can be realized by fabricating the shock stabilizer 50 directly with the fabrication of the body. A body with integrally formed stabilizers 50 may be fabricated by molding, for example, a plastic or other moldable material. The stabilizers can be machined into an appropriate shape after the molding process is completed, or the shape of the stabilizers may be pre-formed in the molding die. An integrally body formed with shock stabilizers according to the invention advantageously eliminates the separate attachment of the stabilizers to the body 10 and increases reliability of the structure. Integrally forming a body with shock stabilizers is applicable when the proper locations of the stabilizers on the body are already known. Molding and other integral body and shock stabilizer manufacturing means are applicable to all of the embodiments described herein. Thus there has been disclosed a method and an apparatus for stabilizing the shock wave on a body moving through a fluid or in a moving fluid. Changes and modifications may be made to the invention which may be readily apparent to those skilled in the art without going beyond the intended scope of the invention, as defined by the appended claims.

What is claimed is:

1. A method for stabilizing a location of the formation of a shock wave on a surface of a body moving in a fluid, said fluid having a boundary layer of flow adjacent said surface of said body, comprising the steps of:

inducing a shock wave to form prematurely at a set location on said body surface; and fixing said induced shock wave to consistently form and remain at said set location by inducing separation of boundary layer flow from said body surface aft of said shock wave formation point.

2. The method of claim 1, wherein said step of inducing comprises the steps of:

determining a region where said shock wave naturally forms;

setting a location forward of said region; and accelerating flow of said fluid at said location to prematurely form a shock wave, and wherein said step of fixing comprises the step of:

providing a discontinuity to said body surface at said location.

3. The method of claim 2, wherein said step of setting a location forward of said region comprises the step of attaching a projection to said surface of said body at said location, said projection having an accelerating surface and an edge above said body surface, and wherein said step of accelerating flow of said fluid comprises the step of flowing said fluid over said accelerating surface, and wherein said step of providing a discontinuity comprises providing said edge.

* * * * *